US011743014B2

(12) United States Patent
Dutta et al.

(10) Patent No.: US 11,743,014 B2
(45) Date of Patent: Aug. 29, 2023

(54) REFERENCE SIGNAL RECEIVE POWER ADAPTATION FOR SIDELINK TRAFFIC

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/225,952

(22) Filed: Apr. 8, 2021

(65) Prior Publication Data

US 2021/0320777 A1     Oct. 14, 2021

Related U.S. Application Data

(60) Provisional application No. 63/008,595, filed on Apr. 10, 2020.

(51) Int. Cl.
*H04L 5/00*     (2006.01)
*H04W 72/04*     (2023.01)
*H04L 27/26*     (2006.01)
*H04W 4/40*     (2018.01)

(52) U.S. Cl.
CPC .......... *H04L 5/0058* (2013.01); *H04L 5/0078* (2013.01); *H04L 27/2614* (2013.01); *H04W 4/40* (2018.02); *H04W 72/04* (2013.01)

(58) Field of Classification Search
CPC . H04L 5/0058; H04L 5/0078; H04L 27/2614; H04L 67/12; H04L 5/005; H04W 4/40; H04W 72/04; H04W 72/02; H04W 72/0446; H04W 72/0453; H04W 72/1226; H04W 72/1263; H04W 76/14; H04W 72/087; H04W 72/10; H04W 72/085; H04W 74/0808
See application file for complete search history.

(56) References Cited

U.S. PATENT DOCUMENTS

| | | | | |
|---|---|---|---|---|
| 2020/0146054 A1* | 5/2020 | Jeon | ...................... | H04L 5/0053 |
| 2020/0252910 A1* | 8/2020 | Wu | ........................ | H04L 5/0055 |
| 2020/0280961 A1* | 9/2020 | Lee | ......................... | H04W 72/10 |
| 2021/0266921 A1* | 8/2021 | Wang | ..................... | H04W 72/02 |
| 2021/0392620 A1* | 12/2021 | Ashraf | .................... | H04L 5/005 |

FOREIGN PATENT DOCUMENTS

| | | | |
|---|---|---|---|
| WO | WO 2019/066629 A1 * | 4/2019 | |
| WO | WO 2020/069879 A1 * | 4/2020 | |

* cited by examiner

*Primary Examiner* — Rushil P. Sampat
(74) *Attorney, Agent, or Firm* — Loza & Loza LLP

(57) ABSTRACT

Aspects of the disclosure relate to wireless communications including sidelink communications between wireless devices. Adaptation of a resource exclusion reference signal receive power (RSRP) threshold for scheduling resources for a device using such sidelink communications includes utilization of first and second time/frequency windows of available resources to determine the number of free resources in each window. If the free resources in either window are less than a predetermined free resource threshold, the resource exclusion RSRP threshold is increased to gain further potential time/frequency resources that may be scheduled by the device.

25 Claims, 9 Drawing Sheets

REFERENCE SIGNAL RECEIVE POWER ADAPTATION FOR SIDELINK TRAFFIC

CROSS REFERENCE TO RELATED APPLICATIONS

This application claims priority to and the benefit of U.S. Provisional Application No. 63/008,595 filed in the U.S. Patent and Trademark Office on Apr. 10, 2020, which is incorporated herein by reference as if fully set forth below in its entirety and for all applicable purposes.

TECHNICAL FIELD

The technology discussed below relates generally to wireless communication networks, and more particularly, to sidelink wireless communication.

INTRODUCTION

In wireless communication systems, a cellular network is implemented by enabling wireless user equipment (UE) to communicate with one another through signaling with a nearby base station or cell. As a user equipment moves across the service area, handovers take place such that each user equipment maintains communication with one another via its respective cell.

Another scheme for a wireless communication system is a device-to-device (D2D) network, in which wireless communication devices may signal one another directly, rather than via an intermediary base station or cell. D2D communication networks may utilize direct signaling (e.g., sidelink signaling) to facilitate direct communication between wireless communication devices. In some D2D configurations, wireless communication devices may further communicate in a cellular system, generally under the control of a base station. Thus, the wireless communication devices may be configured for uplink and downlink signaling via a base station and further for sidelink signaling directly between the wireless communication devices without transmissions passing through the base station.

One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of sidelink wireless communication for a user equipment (UE) is disclosed. The method includes identifying a first number of free resources in a first window of available transmission resources usable for transmission by the UE, and a second number of free resources in at least one second window comprising at least a portion of the available transmission resources. Further, the method includes increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window.

In another example, a user equipment (UE) configured for sidelink wireless communication is disclosed including a processor, a wireless transceiver communicatively coupled to the processor, and a memory communicatively coupled to the processor. The processor and the memory are configured to identify a first number of free resources in a first window of available transmission resources usable for transmission by the UE, and identify a second number of free resources in at least one second window comprising at least a portion of the available transmission resources. Additionally, the processor and memory are configured to increase a resource exclusion reference signal receive power (RSRP) threshold in the UE in response to at least one of the first number of free resources being less than a first percentage of the available transmission resources within the first window or the second number of free resources being less than a second percentage of the available transmission resources within the second window.

In still another example, a user equipment (UE) for sidelink wireless communication in a wireless communication network is disclosed. The UE includes means for identifying a first number of free resources in a first window of available transmission resources usable for transmission by the UE, and means for identifying a second number of free resources in at least one second window comprising at least a portion of the available transmission resources. Further the UE includes means for increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

Figure 1:
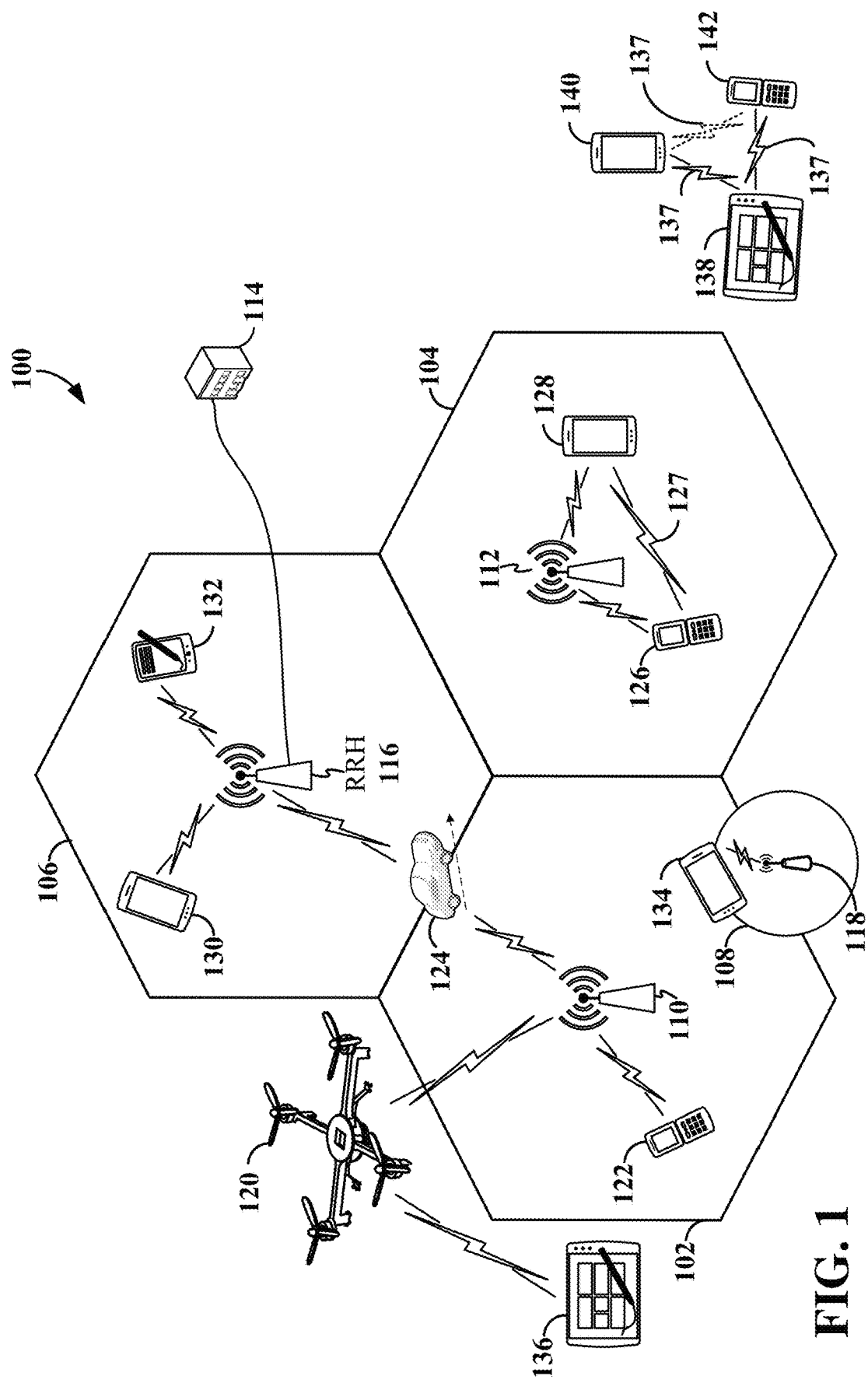
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to reference signal receive power (RSRP) threshold adaptation in communication devices, such as devices used in sidelink communications. Typically, in sidelink communication devices, RSRP threshold adaptation is used by a UE to increase the number of free resources that the UE may use for scheduling a future transmission. If the transmission traffic in a sidelink communication is aperiodic where transmissions do not occur at a fixed period, for example, there may be some degradation of the communication system when a typical percentage for a threshold of free resources over a transmission timeframe is expected. Accordingly, further aspects of the disclosure relate to using first and second windows for RSRP threshold adaptation to ensure better utilization of resources; namely by freeing further resources that may be potentially used by the UE as will be described in more detail below.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
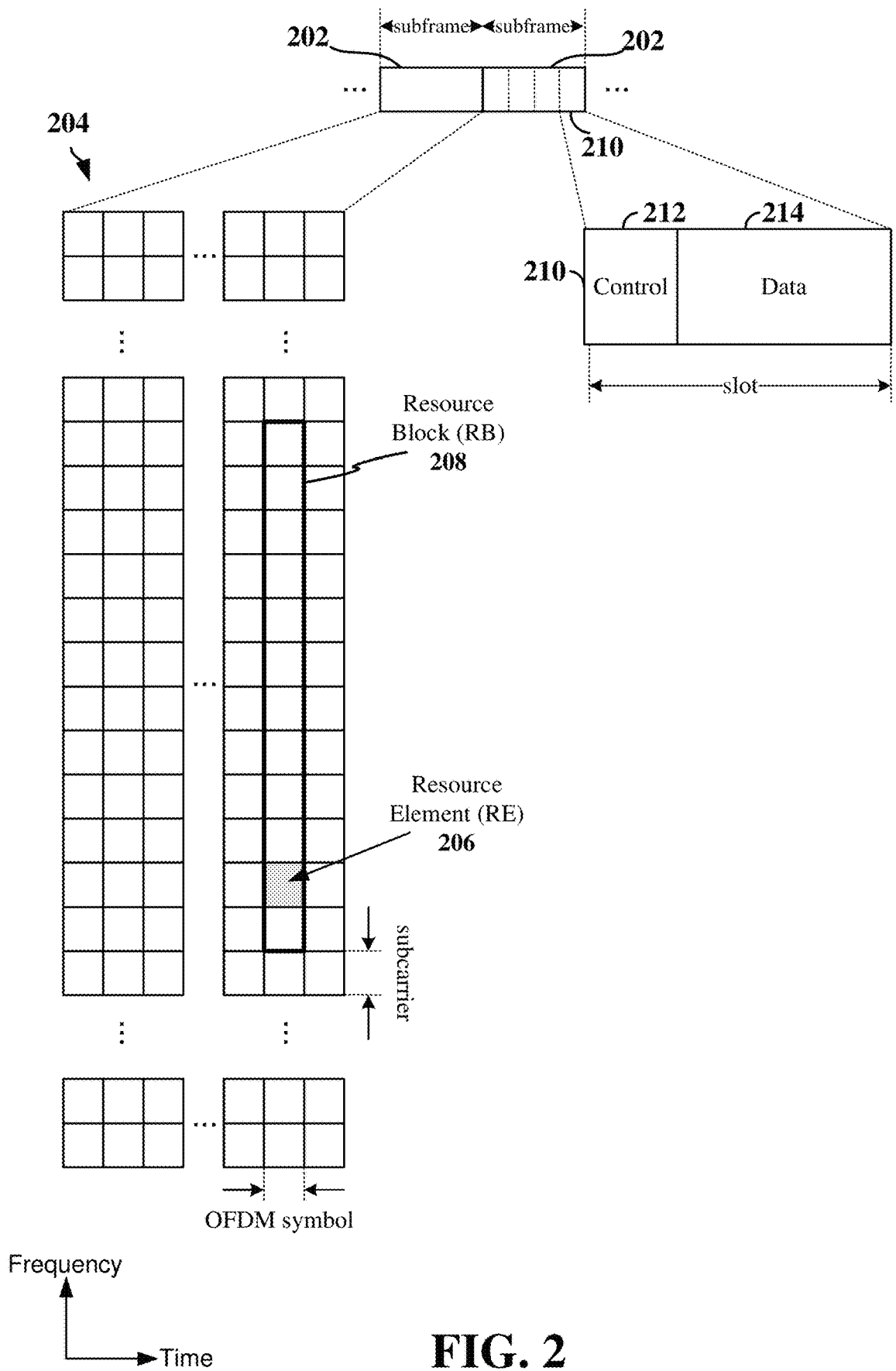
FIG. 2 is a schematic diagram illustrating organization of wireless resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
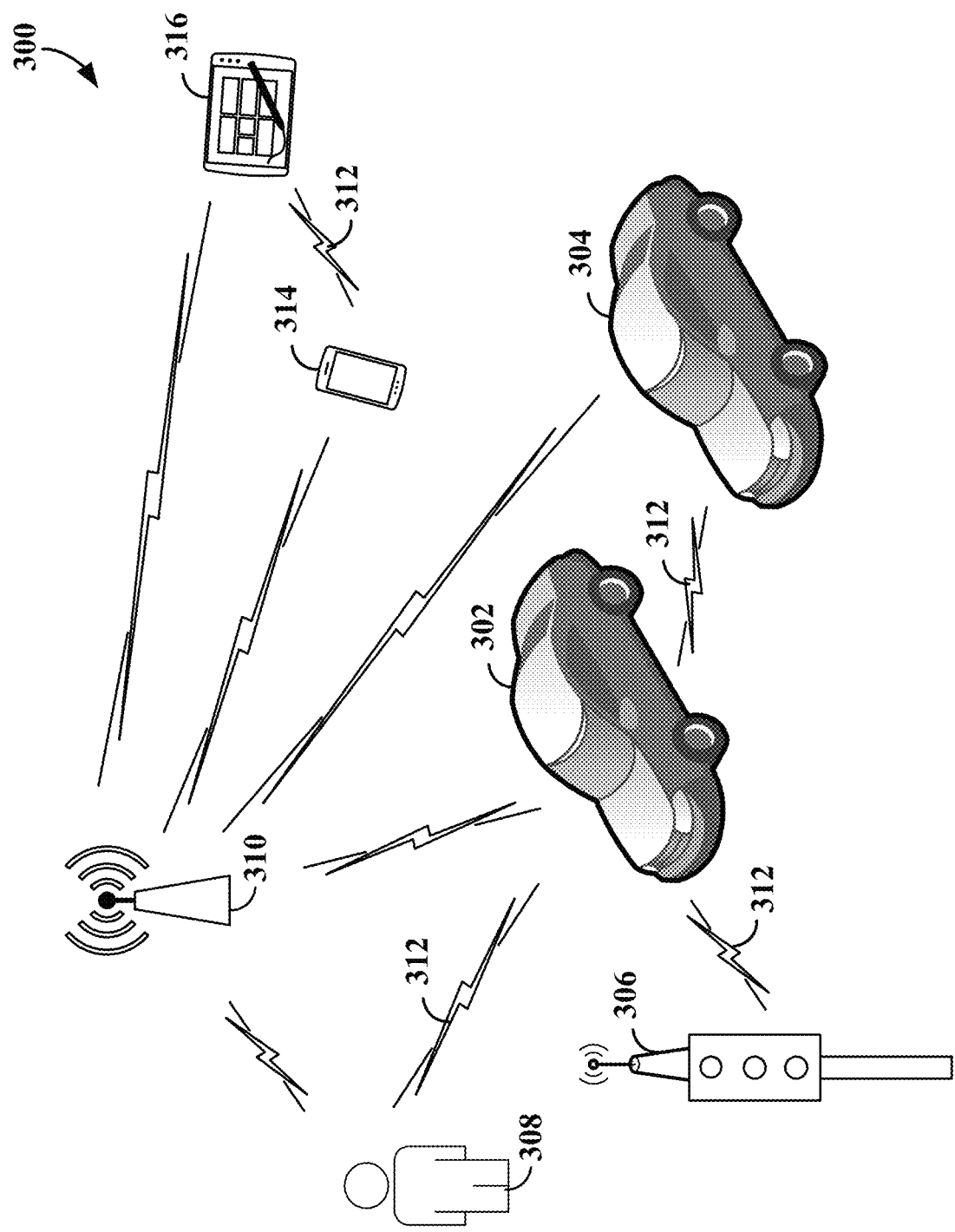
FIG. 3 is a diagram illustrating an example of a wireless communication system utilizing sidelink communication such as vehicle-to-everything (V2X) wireless communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

A V2X transmission may include, for example, unicast transmissions, groupcast transmissions, and broadcast transmissions. Unicast describes a transmission, for example, from a vehicle (e.g., vehicle 202) to one other vehicle (e.g., vehicle 204). Groupcast arises when a group of UEs (e.g., vehicles 202 and 204) form a cluster. Data may be groupcasted within the cluster. Broadcast describes a transmission from, for example, a UE (e.g., vehicle 202) to surrounding receivers (e.g., vehicle 204, RSU 206, mobile devices 208 of pedestrians/cyclists, the network 210, or any combination thereof) in proximity to the transmitting UE.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 4:
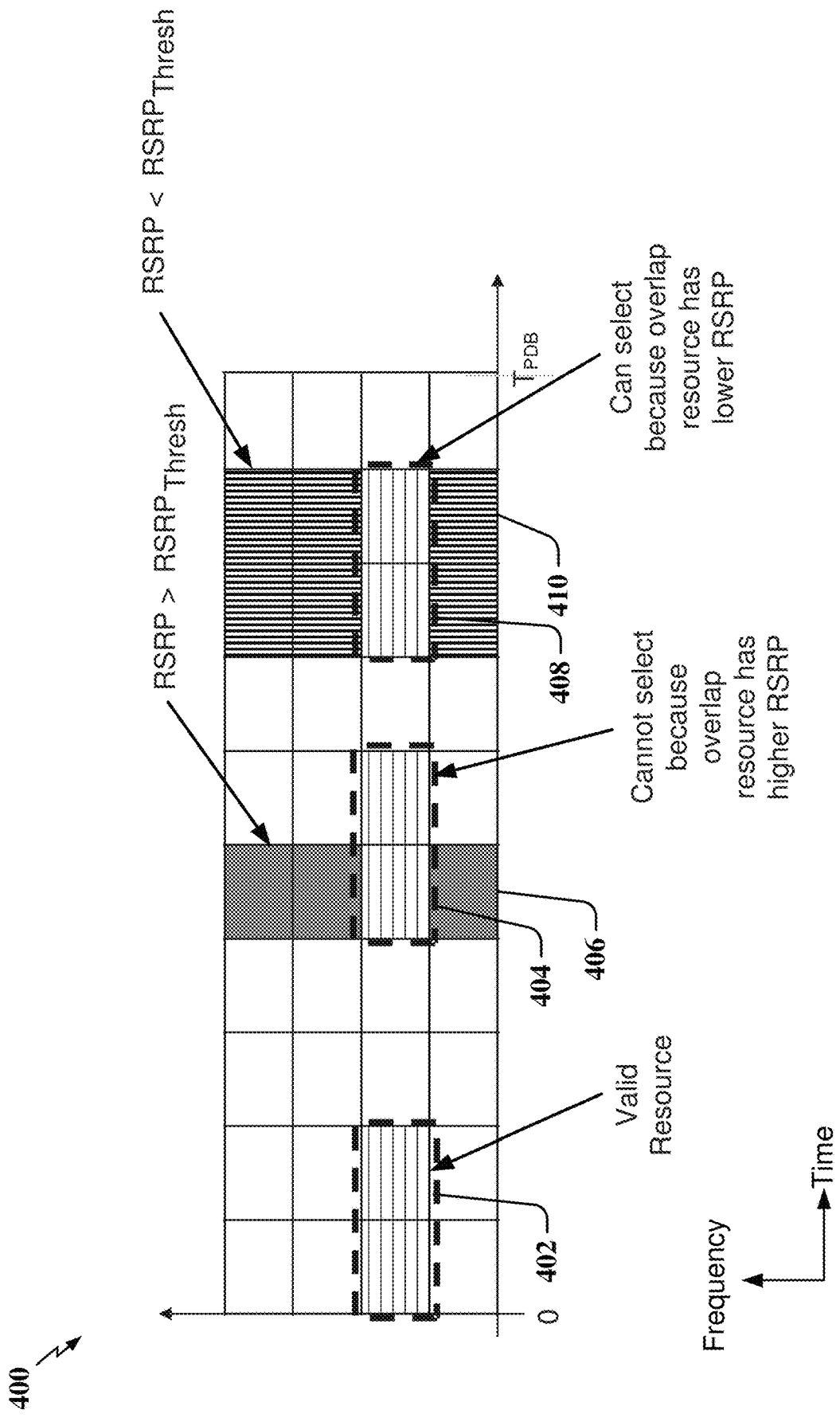
FIG. 4 illustrates a resource grid used by a UE when determining potential wireless resources for transmission according to some aspects.

FIG. 4 illustrates a resource grid 400 used by a UE when determining potential wireless resources (e.g., termed herein as a "candidate resource set") for transmission, such as a sidelink transmission. It is noted that when a packet arrives in a wireless communication device such as a UE in sidelink communication (e.g., UEs 126, 128, 138, 140, or 142 in FIG. 1) for another UE, for example, the UE determines or identifies a set of candidate resources in which it may transmit in a next transmission (which is illustrated by grid 400). Of note, the grid 400 includes scheduled resources known to or determined by the UE through signaling from the other UE in the sidelink communication.

The candidate resource set is chosen from all available resources that are within a packet delay budget (PDB) window or a maximum re-transmission budget window (and whichever is lower in an aspect). The resource grid 400 is an example of potential resources in frequency and time that are within a PDB window from time zero to an end time $T_{PDB}$ of the PDB window (where the term "PDB window" may also be used interchangeably with resource grid 400 in this example as only the PDB window is illustrated by the resource grid 400). It is further noted here that the term "window" may refer to a time window of frequency resources occurring over a particular number of slots. Within the schedulable resources in PDB window 400, it is noted that a time/frequency resource is generally not usable or selectable as a candidate for the candidate resource set if the resource overlaps any other resource that has been reserved by another UE that introduces high interference power (e.g., a UE with a higher RSRP), for example. Notwithstanding, it is noted that even in cases of an overlap of reserved resources, if the measured reference signal receive power (RSRP) from the other reserving UE is less than an RSRP threshold ($RSRP_{Thresh}$), overlapping resources may nonetheless be selected.

As an example of the different selection criteria, FIG. 4 shows a first resource selection 402 that does not overlap with any reserved resources from the other UE, allowing usage of the time/frequency resources without any further determination. In the case where a potential resource overlaps a resource reserved by another UE, however, further analysis based on measured RSRP is needed to determine whether or not the resource may be included in a candidate set of resources. In one example shown in FIG. 4, if a potential resource 404 overlaps a reserved resource 406 but the measured RSRP is greater than the $RSRP_{Thresh}$, those resources cannot be selected as part of the candidate set of resources. On the other hand, if a potential resource 408 overlaps a reserved resource 410 but the measured RSRP is less than the $RSRP_{Thresh}$, those resources may be selected to be part of the candidate set of resources.

In order to cope with traffic variations that may occur in a wireless system, the value of the $RSRP_{Thresh}$ is generally not a fixed value and may be adaptable or changeable based on the traffic variations. In particular, a UE may be configured to start with a low $RSRP_{Thresh}$ and then check whether the candidate set size (i.e., a free or usable resource set size) is at least some percentage (i.e., x %) or ratio of the whole set of resources within the PDB window. This percentage may be called the resource free threshold. If the candidate set size is not above the resource free threshold, the RSRP threshold may be increased by a fixed step size (e.g., 3 dB) in order to increase the amount of resources that might be scheduled. The RSRP threshold may be increased by increments of the fixed step size until the candidate set size condition (i.e., the x % or resource free threshold) is met.

In communication systems such as sidelink communication systems, it is noted that one UE signals its selected resources to another UE for reservation, such as through SCI (e.g., SCI-1) in the physical sideline control channel (PSCCH). Due to SCI size constraints in some systems, however, there are only five (5) bits available for providing signaling of the time gap of reservation time and the time of the actual reserved resources. Accordingly, with only five bits available, the maximum time gap that may be signaled is 31 slots. In situations where the wireless traffic is periodic in nature, a UE can signal the periodicity in which the reservation of resources will repeatedly appear, and the signaled UE may know what the resource reservations will be far into the future.

If wireless traffic is aperiodic, however, a UE can only reliably see at most 31 slots into the future due to the SCI size constraints and the resultant five bit limit on signaling for the resource time gap. Due to the random nature of the time instant when the reservation arrives from the other UE (e.g., randomly in a window of 31 slots in the past), this further diminishes the window of all observable reservations at a given time. For example, it is known in some systems that the window of observable reservations may be around 16 slots. In such situations, if the PDB value is greater than 16 slots, all resources beyond the 16 slot window will be observed as "free" even though they may not be free in reality. Moreover, in such cases the adaptation of the RSRP threshold as discussed earlier will not be triggered as designed as the x % of the resources are seen free due to the control channel size restrictions. This leads to performance degradation.

As an example of performance degradation, if the x % of resources (i.e., resource free threshold) is set to lower values (e.g., less than 50%), all of the candidate resources could be found beyond 32 slots even though earlier resources (i.e., resources in the 0 to 31 slots) may have been feasible with a moderate RSRP drop (e.g., cases of low and moderate traffic). In another example, if the x % of resources is set too high, this percentage amount may not be feasible for high traffic scenarios (i.e., the threshold may not ever be met) leading to unnecessary packet drops. Moreover, if the x % of resources is dependent on the PDB, it may not be possible to have a fixed value for all traffic types.

Figure 5:
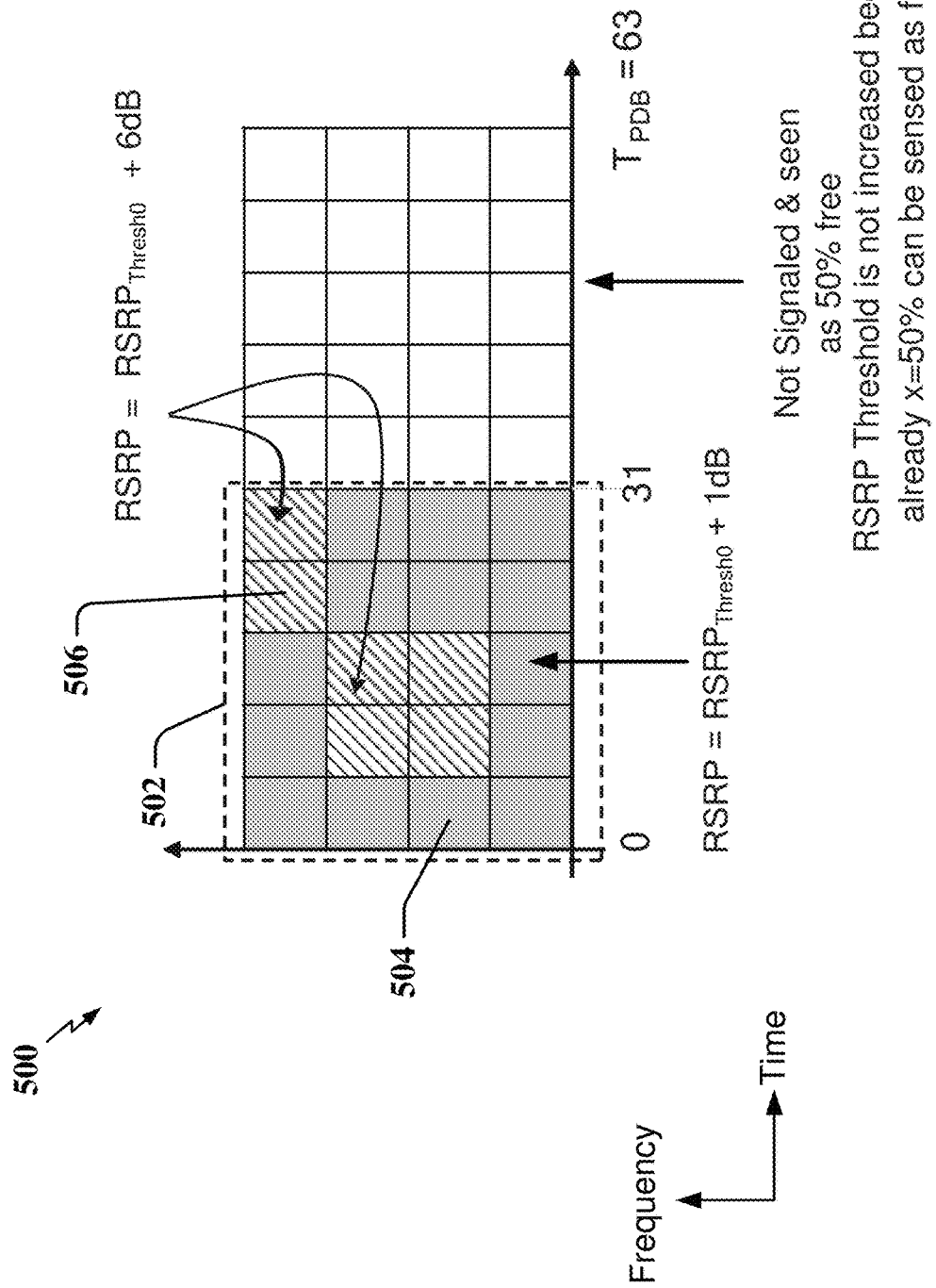
FIG. 5 is a diagram illustrating an example of resources that may be scheduled for sidelink communication in a wireless network according to some aspects.

As a visual illustration of degradation issues that may occur, FIG. 5 illustrates a time/frequency grid of scheduled resources in a PDB 500 having 0 to 63 slots (i.e., $T_{PDB}$=63). In this example, which assumes a best-case scenario in light of the constraints on the SCI size, a first portion 502 of 31 future slots, as one example, may be seen by a UE. In this case, any scheduled resources beyond slot 31 are not seen by the UE and are not signaled (as seen by the UE). Thus, at least 50% of the resources of the PDB 500 are considered free resources. In a case where the x % is equal to or less than 50%, adaptation of the RSRP discussed before would not take place as 50% of the PDB may already be sensed as being free.

Additionally, it is noted that in the window 502, none of the resources therein are shown to be initially free in this example. Without the adaptation of the $RSRP_{Thresh}$, which will occur in this example as the x %=50%, no overlapped resources will be used by the UE through $RSRP_{Thresh}$ adaptation. This example illustrates that if $RSRP_{Thresh}$ adaptations could be used, even a 1 dB increase in the initial $RSRP_{Thresh}$ (i.e., $RSRP_{Thresh0}$) could yield 14 out of 20 illustrated resource blocks (shown with gray shading and indicated by blocks such as block 504) that could be used by the UE, which would be a 70% increase of free resources. Further, if two 3 dB increase iterations of $RSRP_{Thresh}$ adaptation were performed (i.e., $RSRP_{Thresh0}$+6 dB), a further six resource blocks (shown with diagonal shading such as indicated at block 506) could be utilized by the UE. Accordingly, it would be beneficial to be able to capture at least some of these resources in this first time period (e.g., slots 0 to 31) for use by the UE in such situations through RSRP threshold adaptation.

In light of the issues discussed above, the present disclosure provides for improved RSRP threshold adaptation by utilizing at least two windows for determining whether or not to perform increase of the RSRP threshold (also termed "resource exclusion RSRP threshold" as resources with measured RSRP greater than the resource exclusion RSRP threshold will cause such resources to be excluded from scheduling). In one aspect of this RSRP threshold adaptation, a value of the resource free threshold is configured as a ratio or a percentage x %, (e.g., x=20%, 50%, or some other value). A first window, similar to the method discussed above, is from time 0 to the time $T_{PDB}$, or the whole of the PDB resources. A second window is configured as some Y number of slots (e.g. Y=32 slots (i.e., slot 0 to slot 31 (or Y−1)) or Y=16 slots (i.e., slot 0 to slot 15 (or Y−1))). In operation, a first determination or identification is made whether at least the x % of resources for the first window (i.e., slots 0 to PDB) are free, and second determination or identification is made whether a least the same x % of resources for the second window (i.e., slot 0 to Y−1) are free. If both conditions indicate free resources above the x % threshold, then no change is made to the resource exclusion RSRP threshold. However, if one of the checked conditions indicates that at least the x % threshold of free resources in either of the first or second window is not met, then the resource exclusion RSRP threshold is increased. In other words, if either window has too low of a resource exclusion RSRP threshold to not yield free resources above the desired resource free threshold x %, then the RSRP will be increased. In particular, it is noted that the use of the second window of Y slots from slot 0 to slot Y−1, generally being in the first part of the PDB, affords the ability to capture resources earlier in time through RSRP threshold adaptation and thereby increases the packet reception rate and decreases latency.

In further aspects, it is noted that the resource exclusion RSRP threshold may be increased by a predetermined step amount (e.g., 3 dB). Additionally, the process may be iteratively repeated until the RSRP threshold is increased to the point that both the first and second windows are determined to have the x % of free resources available.

Figure 6:
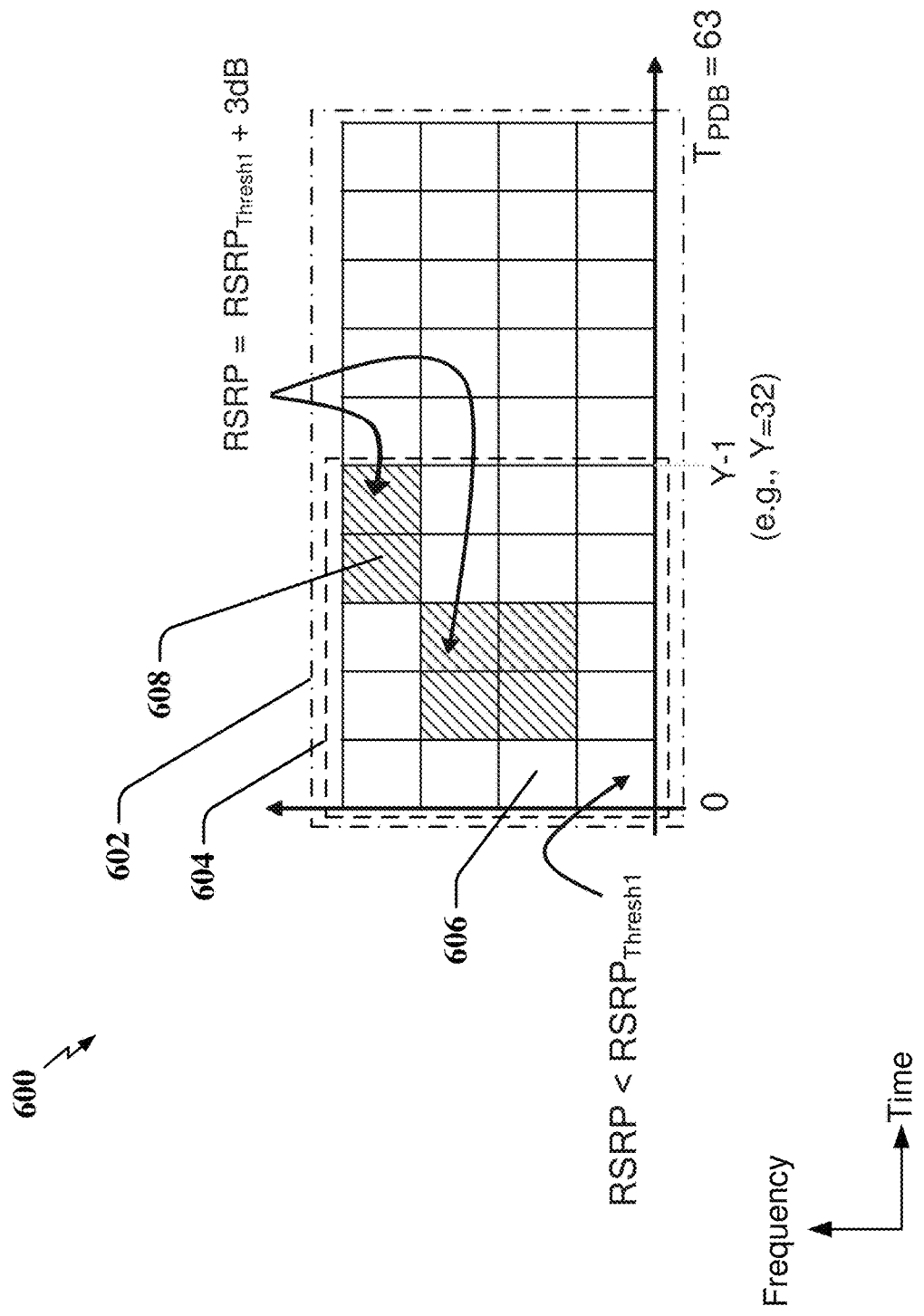
FIG. 6 is a diagram illustrating another example of resources that may be scheduled for sidelink communication in a wireless network according to disclosed aspects according to some aspects.

FIG. 6 illustrates an exemplary time/frequency resource grid 600 based on the example in FIG. 5, but where two windows are utilized in the determination of when to apply RSRP adaptation as discussed above. FIG. 6 illustrates that the grid 600 of time/frequency resources illustrated is a PDB. In this example, the PDB time is 64 slots (i.e., from slot 0 to slot 63). A first window 602 is shown from time 0 to the time of the PDB ($T_{PDB}$). In this particular illustrated case, the illustrated PDB is 64 slots (0 to 63), although this is merely exemplary and the disclosure is not necessarily limited to such. A second window of Y slots is denoted with reference number 604. In the illustrated example, Y is shown having a value of 32, but is not limited to such.

Referring back to FIG. 5, it is noted that when the two window scheme is used with this example, when the Y sized second window condition is considered (i.e., if the x % threshold of the free resources in the Y sized window is exceeded or not), when the x % threshold is not exceeded, then the resource exclusion RSRP threshold is increased, such as by a step of 3 dB. In this case, those resources that were only 1 dB below an initial RSRP threshold (e.g., the resources of block 504 and the same shaded blocks in FIG. 5) that would yield an increase in free resources if the RSRP threshold was raised at least 1 dB, the step increase of 3 dB will assuredly result in those resources being considered as a candidate resources that may be used by the UE.

Accordingly, turning back to FIG. 6, when the condition that the x % threshold of the free resources in the Y sized window is not met as discussed above, the resource exclusion RSRP threshold is then raised by the predetermined step, which is 3 dB in this scenario, but is not limited to such. Accordingly, those resources shown by shaded block 504, for example, will now be in the set of potentially available or candidate resources that may be used by the UE. This change is then shown in FIG. 6 with these blocks being represented as unshaded boxes as exemplified by block 606, as an example. For these resources, the measured RSRP may then become less than the now raised resource exclusion RSRP threshold (denoted also as $RSRP_{Thresh1}$). As mentioned before in connection with the exa6mple of FIG. 5, this threshold increase may raise the number of available free resources from 0% to 70% (i.e., 12 of 16 blocks). Assuming an x % free resource threshold for both the first and second windows 602 and 604 is less than 70%, the next iteration of the methodology would yield a determination that the amount of free resources exceeds the x % free resource threshold, and no further RSRP adaptation would be performed. Also based on this assumption, it is noted that the remaining resources exemplified by diagonal shading blocks (e.g., block 608) would not be available for inclusion in the potentially available or candidate set of resources.

Figure 7:
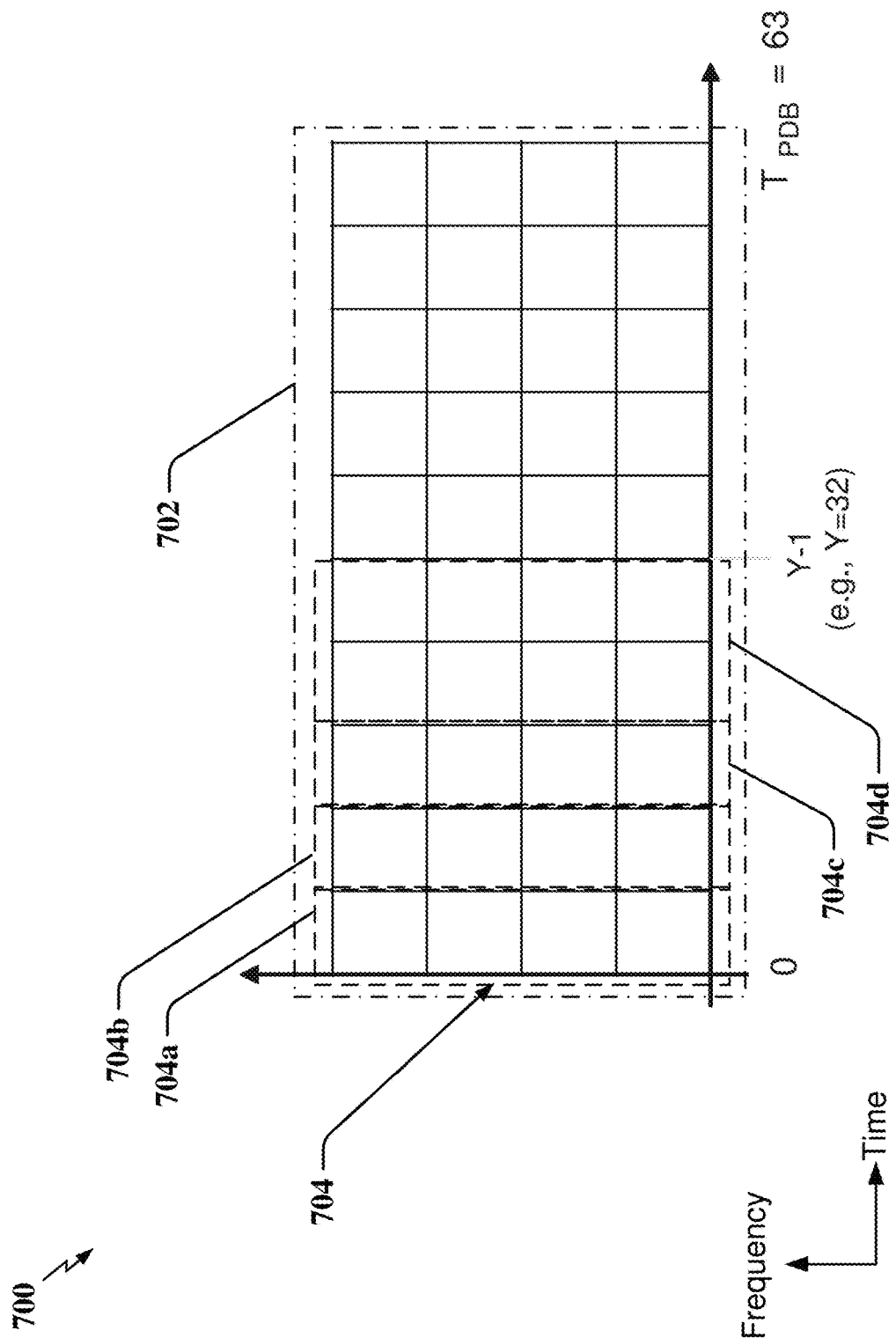
FIG. 7 a diagram illustrating an example of resources that may be scheduled for sidelink communication in a wireless network according to some aspects.

While the example above assumed that the x % free resource threshold was the same for both the first and second windows 602 and 604, it is noted that these percentages do not necessarily need to be equal. Accordingly, in one aspect, while the first window may be again sized from 0 to PDB and second window sized with a Y number of slots, the resource free thresholds may be configured with respective p % and q % values rather than the same percentage. Accordingly, the methodology with such a scheme may involve first checking whether a p % of resources for 0 to PDB are free and whether a q % of resources for 0 to Y are free. If not, the methodology would include increasing the resource exclusion RSRP threshold, such as by a predetermined step size and then repeating checking whether the p % of resources for 0 to PDB are free and whether the q % of resources for 0 to Y are free According to yet another example, rather than using a single second window as in the examples above, the UE may use utilize a second window including a plurality of non-overlapping windows as illustrated in the example of FIG. 7. In this example, a first window 702, similar to the previous examples, may be configured to cover from a time or slot 0 to a PDB (e.g., slot 63). The second window shown generally at 704, however, is broken into multiple windows 704a-704d in this example, but may be any of a number of windows that are non-overlapping. The total number of slots in window 704 may still be a value $Y_T$, which is, in turn, broken down into multiple slot ranges. In this example, window 704a may extend from a range of slot 0 to a slot $Y_1$, window 704b may extend from a range of slot $Y_1$ to a slot $Y_2$, window 704c from slot $Y_2$ to slot $Y_3$, and window 704d from slot $Y_3$ to a slot $Y_4$. In this example, the slot $Y_4$ could be equal to value $Y_T-1$. For example, for a $Y_T=32$, $Y_4$ would be slot 31, or for a $Y_T=64$, $Y_4$ would be slot 63. Additionally, each of the plurality of windows 704a-704d may be equal in the number of slots or time, or different as illustrated in the example of FIG. 7 (i.e., window 704d is larger than windows 704a, 704b, or 704c).

Moreover, each of the plurality of windows 704a-704d may be associated with the same or a different resource free threshold percentages (e.g., all equal to an x % or having respective percentages such as $x_1$; $x_2$, $x_3$, and $x_4$ percentages. In further aspects, the methodology may include checking if x % of resources are available between 0 and PDB and then checking if x % is available for each of windows 702a-702d or, alternatively, checking if $x_1$ % is available for window 702a (e.g., [0,$Y_1$]), $x_2$ % is available for window 702b (e.g., [$Y_1$,$Y_2$]), $x_3$ % is available for window 702c (e.g., [$Y_2$,$Y_3$]), and $x_4$ % is available for window 702d (e.g., [$Y_3$,$Y_4$]). In either case, if all of conditions are not satisfied (i.e., at least one condition shows that the free resource percentage is not met), the resource exclusion RSRP threshold is increased, such as by a predetermined step size, and repeated iteratively until all conditions are satisfied.

In other aspects of the methods described above in connection with FIGS. 5-7, it is noted that methods are implementable in a UE device. Furthermore, it is noted that the determinations and signaling may be effected at the physical PHY and media access control (MAC) layers, although the UE may be configured to effect this PHY/MAC implementation through radio resource control (RRC) messages and signaling from a gNB, a Sync UE, an RSU, and via either a sidelink (PC5) from another UE or a Uu downlink from the gNB. In other aspects, the identification or determination of the available resources may be based, at least in part, on SCI received in one UE from the other UE in a sidelink communication link.

According to yet further aspects, the window size(s) and the resource free threshold(s) are pre-configured or predetermined. In still other aspects, the window size(s) and the resource free threshold(s) may be configured using RRC messages and signaling from a gNB, a Sync UE, and RSU, as examples, as well as over the sidelink or a Uu downlink.

In yet further aspects of the present disclosure, the time or size of the first or second windows is not necessarily fixed, but rather may vary based on the traffic type and the PDB size. Moreover, if the Y value of the second window exceeds the PDB value, in an aspect the procedures described above would not be implemented. In still other aspects, one implementation may include that the first window is determined to be in a range of particular slots (e.g., a slot 0 to a slot 20) and the second window has a predetermined number of slots from the slot 0 to a predetermined Y number of slots where Y is greater than 20, such as Y=32, for example. In this case, the second check for the second window would not be performed and the resource exclusion RSRP limit or threshold changes based only on the number of available resources between slot 0 and slot 20.

Figure 8:
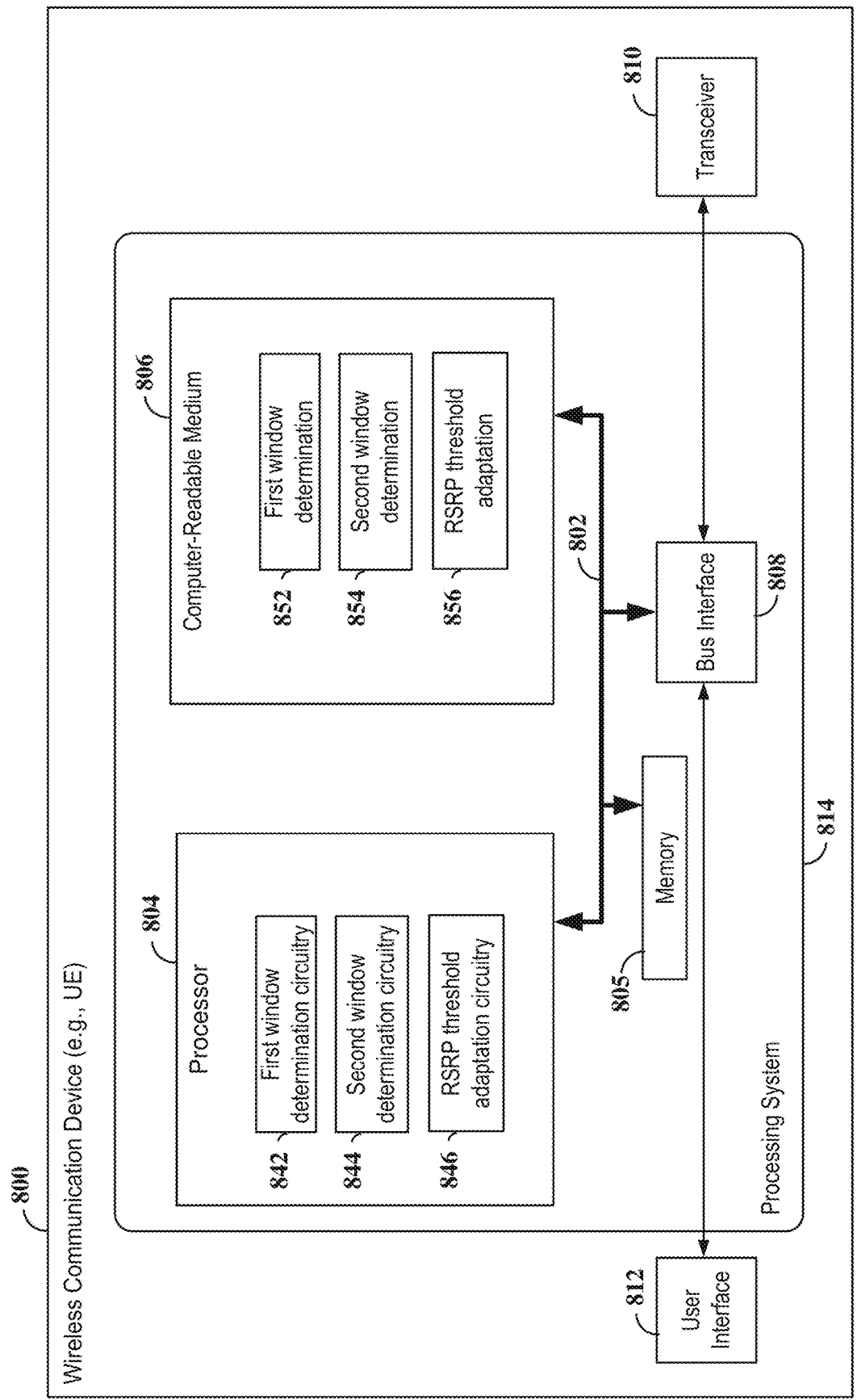
FIG. 8 is a diagram illustrating an example of a hardware implementation for a wireless communication device (e.g., a UE) employing a processing system according to some aspects.

FIG. 8 is a block diagram illustrating an example of a hardware implementation for a wireless communication device 800 employing a processing system 814. For example, the wireless communication device 800 may correspond to a UE, a V2X device, D2D device or other suitable sidelink device, as shown and described above in reference to FIGS. 1 and 2.

The wireless communication device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 800 may be configured to perform any one or more of the functions described herein. That is, the processor 804, as utilized in the wireless communication device 800, may be used to implement any one or more of the processes and procedures described below.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further.

A bus interface 808 provides an interface between the bus 802 and a transceiver 810. The transceiver 810 provides a means for communicating with various other apparatus over a transmission medium (e.g., air interface). Depending upon the nature of the apparatus, a user interface 812 (e.g., keypad, display, touch screen, speaker, microphone, control knobs, etc.) may also be provided. In aspects, such a user interface 812 is optional, and may be omitted in some examples.

The processor 804 is responsible for managing the bus 802 and general processing, including the execution of software stored on the computer-readable medium 806. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 804, causes the processing system 814 to perform the various functions described below for any particular apparatus. The computer-readable medium 806 and the memory 805 may also be used for storing data that is manipulated by the processor 804 when executing software.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. In some examples, the computer-readable medium 806 may be part of the memory 805. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include first window determination circuitry 842 configured to identify, check, or determine free transmission resources in a first window (e.g., a PDB window), such as was discussed above with respect to FIGS. 5-7, as well as determine or set a free resource percentage or ratio threshold. The first window determination circuitry 842 may further be configured to execute first window determination instructions or software 852 stored on the computer-readable medium 806 to implement one or more functions described herein.

In further aspects, the first window determination circuitry 842 may be configured to receive RRC messaging via the transceiver 810 for setting a first free resource percentage or ratio threshold. Moreover, the first window determination circuitry 842 may be configured to identify, check, or determine when a first number of free resources in a first window of available transmission resources usable for transmission by the UE or wireless communication device is less than a first percentage of the available transmission resources within the first window.

The processor 804 may further include second window determination circuitry 844 configured to determine free resources in one or more second windows (e.g., PDB windows), such as was discussed above with respect to FIGS. 5-7. The second window determination circuitry 844 may further be configured to execute second windows determination instructions or software 854 stored on the computer-readable medium 806 to implement one or more functions described herein.

In further aspects, the second window determination circuitry 844 may be configured to receive RRC messaging via the transceiver 810 for setting a second free resource percentage or ratio threshold concerning the one or more second windows. Moreover, the second window determination circuitry 844 may be configured to identify, check, or determine when a second number of free resources in at least one second window made up of at least a portion of the available transmission resources is less than a second percentage of the available transmission resources within the second window.

The processor 804 may further include RSRP threshold adaptation circuitry 846, configured to change, adjust, adapt, or modify a resource exclusion RSRP. In an aspect, the resource assignment and scheduling circuitry 846 may implement making determinations of when the first and/or at least one second window include free resources exceeding the first and/or second percentages that are determined by circuitries 842 and 844. The RSRP threshold adaptation circuitry 846 may further be configured to execute RSRP threshold adaptation instructions or software 856 stored on the computer-readable medium 806 to implement one or more of the functions described herein.

Figure 9:
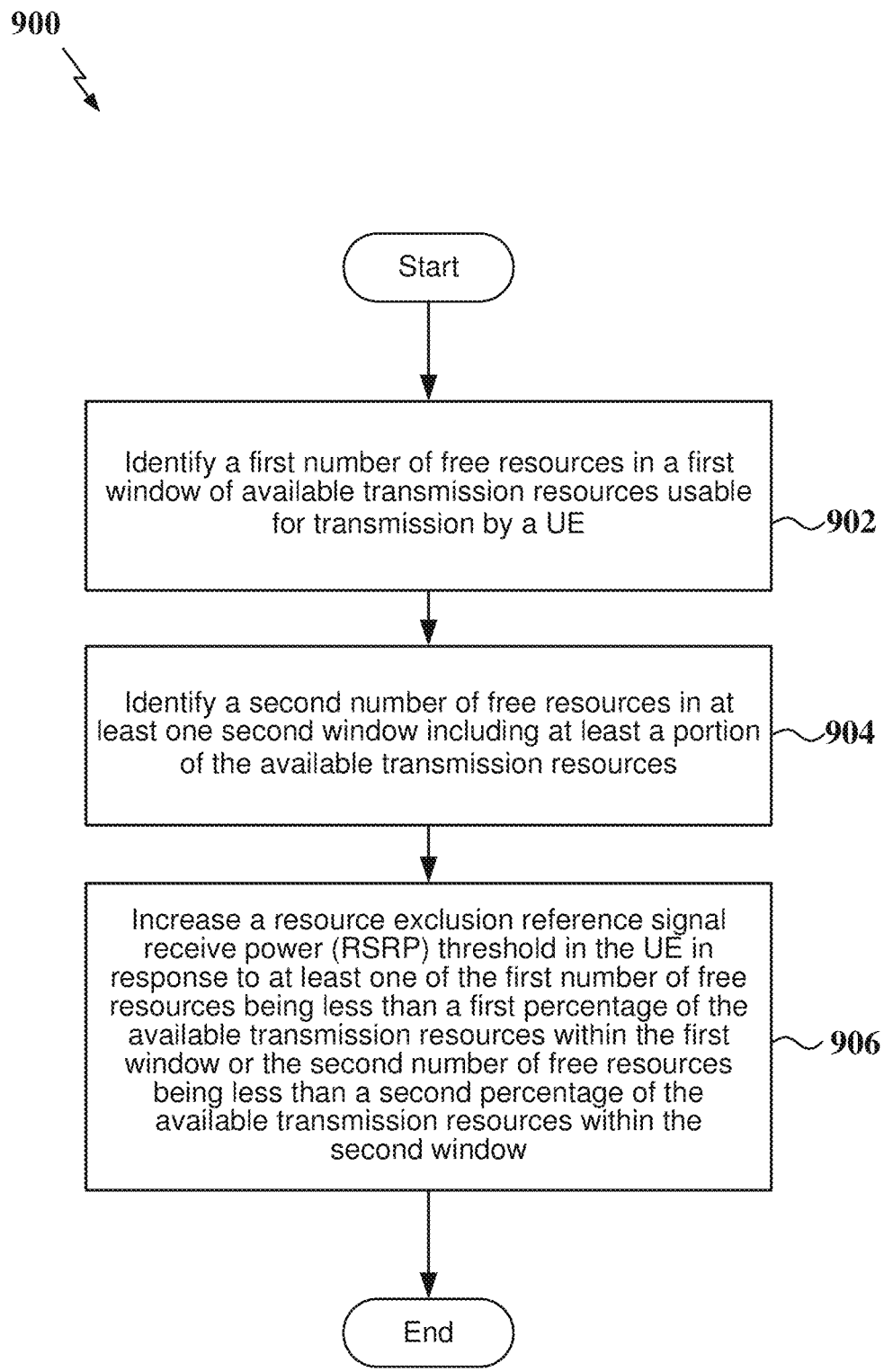
FIG. 9 is a flow chart of an exemplary method of wireless communication at a wireless communication device (e.g., UE) in a sidelink wireless communication system according to some aspects.

In other aspects, the RSRP threshold adaptation circuitry 846 may be configured to increase the resource exclusion RSRP threshold in the UE when at least one of the first number of free resources or the second number of free resources is less than the respective first percentage or second percentage. In this instance, Furthermore, the circuitry 842, 844, and 846 may be configured to repeatedly and/or iteratively determine, identify, or check the percentage or ratio of free resources in the first and second windows and increase the resource exclusion RSRP threshold FIG. 9 is a flow chart of a method 900 for wireless communication at a UE (e.g., a UE or other transmitting sidelink device). As described below, some or all illustrated features may be omitted in a particular implementation within the scope of the present disclosure, and some illustrated features may not be required for implementation of all examples. In some examples, the method 900 may be performed by the UE or wireless communication device 800, as described above and illustrated in FIG. 8, by a processor or processing system, or by any suitable means for carrying out the described functions.

At block 902, the UE may identify, check, or determine a first number of free resources in a first window of available transmission resources usable for transmission by the UE. In other aspects, the processes of block 902 may include determining or identifying when the first number of resources is less than a first percentage of the available transmission resources within the first window. In some examples, the first window determination circuitry 842, shown and described below in connection with FIG. 8, or equivalents thereof, provide means for identifying when the first number of free resources in the first window of available transmission resources usable for transmission by the UE, including, in some aspects, when the first number of resources is less than the first percentage of the available transmission resources within the first window. Furthermore, the first window determination circuitry 842 and the transceiver 810, shown and described below in connection with FIG. 8, may provide means for determining the first percentage including receiving RRC signaling from another UE or base station that enables the first window determination circuitry 842 to determine the value of the percentage or a ratio of available transmission resources, as well as determine the window size.

At block 904, the UE may identify or determine a second number of free resources in at least one second window including at least a portion of the available transmission resources. In further aspects, the processes of block 904 may include determining or identifying that the second number of free resources is less than a second percentage of the available transmission resources within the second window. In some examples, a second window determination circuitry 844 shown and described below in connection with FIG. 8, or equivalents thereof, may provide means for the identification or determination shown in block 904 including identifying the second number of free resources in at least one second window including at least a portion of the available transmission resources, and further, in some aspects, determining the second number of free resources is less than a second percentage of the available transmission resources within the second window. Furthermore, the second window determination circuitry 844 and the transceiver 810, shown and described below in connection with FIG. 8, or equivalents thereof, may provide means for determining the second percentage including receiving RRC signaling from another UE or base station that enables the second window determination circuitry 844 to determine the value of the percentage or a ratio of available transmission resources within the second window, as well as determine the window size.

At block 906, the UE may increase a resource exclusion reference signal receive power (RSRP) threshold in response to at least one of the first number of free resources being less than the first percentage of the available transmission resources within the first window or the second number of free resources being less than the second percentage of the available transmission resources within the second window. In some further examples, the RSRP threshold adaptation circuitry 846 shown and described below in connection with FIG. 8, or equivalents thereof, may provide means for the identification or determination shown in block 906 including identifying or determining when at least one of the first number of free resources or the second number of free resources is less than the respective first percentage or second percentage and increasing the resource exclusion reference signal receive power (RSRP) threshold in the UE. Furthermore, in other aspects the RSRP threshold adaptation circuitry 846 and the transceiver 810, shown and described below in connection with FIG. 8, or equivalents thereof, may provide means for determining an incremental or step value to increase the RSRP threshold value through received RRC signaling from another UE or base station.

In other aspects, method 900 may include an implementation where the first percentage and the second percentage are equal, such as was described above in connection with FIG. 6, or different such as was also described before.

According to further aspects, method 900 may include the first window including a first predetermined number of slots and the second window including a second predetermined number of slots where the first predetermined number of slots is from a slot 0 to a slot n and the second predetermined number of slots is from the slot 0 to a predetermined Y number of slots where Y is less than n. In another aspect, the first predetermined number of slots is from a slot 0 to a slot m and the second predetermined number of slots is from the slot 0 to a predetermined Y number of slots where Y is greater than m. In this particular instance, method 900 will further include using only the determination of whether a first number of free resources in the first window is less than the first percentage of the available transmission resources within the first window for increasing the resource exclusion RSRP threshold. In other aspects, method 900 includes that the resource exclusion RSRP threshold is increased by a predetermined step size, such as 3 dB discussed earlier.

In still other aspects, method 900 may include further increasing the resource exclusion RSRP threshold based only on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m.

In other aspects, method 900 may include further increasing or re-determining the RSRP threshold after previously increasing the resource exclusion RSRP threshold, when the first number of free resources in the first window of available transmission resources usable for transmission by the UE is less than the first percentage of the available transmission resources within the first window, and further increasing or re-determining the resource exclusion RSRP threshold when the second number of free resources in the at least one second window is less than the second percentage of the available transmission resources within the second window. Additionally, this process includes further increasing the resource exclusion RSRP threshold in the UE when at least one of the first number of free resources or the second number of free resources is less than the respective first percentage or second percentage.

According to yet another aspect, method 900 includes the at least one second window including a plurality of second windows within the first window of available transmission resources, wherein the plurality of second windows is non-overlapping in time, such as was discussed before with regard to FIG. 7. The method 900 also includes determining whether the second number of free resources in a first window of the plurality of second windows is less than the second percentage of the available transmission resources within the first window of the plurality of second windows. Moreover, the method 900 includes determining whether a third number of free resources in a second window of the plurality of second windows is less than a third percentage of the available transmission resources within the second window of the plurality of second windows. Additionally, method 900 includes increasing the RSRP threshold in the UE when at least one of the first number of free resources, the second number of free resources, or the third number of free resources is less than the respective first percentage, second percentage, or third percentage.

According to other aspects, a size of the first and second windows is predetermined. Further, the first and second percentages may be predetermined. Also, a size of the at least one second window may be configured based on radio resource control (RRC) messages received from one of a base station over a downlink channel, another UE in communication with the UE via a sidelink, or a vehicle roadside unit (RSU). Moreover, the first and second percentages may be predetermined based on radio resource control (RRC) messages received from one of a base station over a downlink channel, another UE in communication with the UE via a sidelink, a vehicle roadside unit (RSU), or preconfigured in the UE.

In yet other aspects, method 900 may include that a size of the first window is a function of the type of traffic being transmitted by one of the UE or another wireless communication device in communication with the UE. In still one more aspect, method 800 may include determining a plurality of sizes (or a list of sizes) for the at least one second window, wherein each of the plurality of sizes is based on a respective traffic class or packet delay budget (PDB).

The following provides an overview of aspects of the present disclosure:

Aspect 1: A method of sidelink wireless communication for a user equipment (UE) comprising: identifying a first number of free resources in a first window of available transmission resources usable for transmission by the UE; identifying a second number of free resources in at least one second window comprising at least a portion of the available transmission resources; and increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window.

Aspect 2: The method of aspect 1, wherein the first percentage and the second percentage are equal.

Aspect 3: The method of aspect 1 or 2, wherein the first window comprises a first predetermined number of slots and the second window comprises a second predetermined number of slots.

Aspect 4: The method of aspect 3, wherein the first predetermined number of slots is from a slot 0 to a slot n and the second predetermined number of slots is from the slot 0 to a predetermined Y number of slots where Y is less than n.

Aspect 5: The method of any of aspects 1 through 4, wherein the increasing the resource exclusion RSRP threshold further comprises increasing the resource exclusion RSRP threshold based only on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m.

Aspect 6: The method any of aspects 1 through 4, wherein the increasing the resource exclusion RSRP threshold further comprises increasing the resource exclusion RSRP threshold by a predetermined step size.

Aspect 7: The method of any of aspects 1 through 6, further comprising further increasing the resource exclusion RSRP threshold in the UE in response to at least one of the first number of free resources or the second number of free resources remaining less than the respective first percentage or second percentage after increasing the resource exclusion RSRP threshold.

Aspect 8: The method of any of aspects 1 through 7, further comprising the at least one second window comprising a plurality of second windows within the first window of available transmission resources, wherein the plurality of second windows are non-overlapping in time; identifying a third number of free resources in a second window of the plurality of second windows; and increasing the resource exclusion RSRP threshold in the UE in response to least one of the first number of free resources, the second number of free resources, or the third number of free resources is less than the respective first percentage, second percentage, or third percentage.

Aspect 9: The method of any of aspects 1 through 8, wherein a size of the first and second windows is predetermined.

Aspect 10: The method of any of aspects 1 through 8, wherein the first and second percentages are predetermined.

Aspect 11: The method of any of aspects 1 through 10, wherein a size of the at least one second window is configured based on at least one radio resource control (RRC) message received from one of a base station over a downlink channel, another UE in communication with the UE via a sidelink.

Aspect 12: The method any of aspects 1 through 11, wherein the first and second percentages are predetermined based on at least one radio resource control (RRC) message received from one of a base station over a downlink channel, another UE in communication with the UE via a sidelink, or preconfigured in the UE.

Aspect 13: The method of any of aspects 1 through 12, wherein a size of the first window is a function of a type of traffic being transmitted by one of the UE or another UE in communication with the UE.

Aspect 14: The method of any of aspects 1 through 13, further comprising configuring a plurality of sizes for the at least one second window, wherein each of the plurality of sizes is based on a respective traffic class or packet delay budget.

Aspect 15: A user equipment (UE) configured for sidelink wireless communication, comprising: a processor; a wireless transceiver communicatively coupled to the processor; and a memory communicatively coupled to the processor, wherein the processor and the memory are configured to: identify a first number of free resources in a first window of available transmission resources usable for transmission by the UE; identify a second number of free resources in at least one second window comprising at least a portion of the available transmission resources; and increase a resource exclusion reference signal receive power (RSRP) threshold in the UE in response to at least one of the first number of free resources being less than a first percentage of the available transmission resources within the first window or the second number of free resources being less than a second percentage of the available transmission resources within the second window.

Aspect 16: The UE of aspect 15, wherein the first percentage and the second percentage are equal.

Aspect 17: The UE of aspect 16 or 17, wherein the first window comprises a first predetermined number of slots and the second window comprises a second predetermined number of slots.

Aspect 18: The UE of any of aspects 15 through 17, wherein the first predetermined number of slots is from a slot 0 to a slot n and the second predetermined number of slots is from the slot 0 to a predetermined Y number of slots where Y is less than n.

Aspect 19: The UE of any of aspects 15 through 18, wherein the processor and memory are further configured to increase the resource exclusion RSRP threshold based only on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m.

Aspect 20: The UE of any of aspects 15 through 19, wherein the processor and the memory are further configured to increase the resource exclusion RSRP threshold by a predetermined step size.

Aspect 21: The UE of any of aspects 15 through 20, wherein the processor and the memory are further configured to increase the resource exclusion RSRP threshold based only on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m.

Aspect 22: The UE of any of aspects 15 through 21, further comprising the at least one second window comprising a plurality of second windows within the first window of available transmission resources, wherein the plurality of second windows is non-overlapping in time, and the processor and the memory further configured to: identify a third number of free resources in a second window of the plurality of second windows; and increase the resource exclusion RSRP threshold in the UE in response to least one of the first number of free resources, the second number of free resources, or the third number of free resources is less than the respective first percentage, second percentage, or third percentage.

Aspect 23: The UE of any of aspects 15 through 22, wherein a size of the first and second windows is predetermined.

Aspect 24: The UE of any of aspects 15 through 23, wherein the first and second percentages are predetermined.

Aspect 25: The UE of any of aspects 15 through 24, wherein a size of the at least one second window is configured based on radio resource control (RRC) messages received from one of a base station over a downlink channel, another UE in communication with the UE via a sidelink, or a vehicle roadside unit (RSU).

Aspect 26: The UE of any of aspects 15 through 25, wherein the first and second percentages are predetermined based on radio resource control (RRC) messages received from one of a base station over a downlink channel, another UE in communication with the UE via a sidelink, a vehicle roadside unit (RSU), or preconfigured in the UE.

Aspect 27: The UE of any of aspects 15 through 26, wherein a size of the first window is a function of a type of traffic being transmitted by one of the UE or another UE in communication with the UE.

Aspect 28: The UE of any of aspects 15 through 27, wherein the processor and the memory are further configured to configure a plurality of sizes for the at least one second window, wherein each of the plurality of sizes is based on a respective traffic class or a respective packet delay budget.

Aspect 29: A user equipment (UE) for sidelink wireless communication in a wireless communication network, comprising: means for identifying a first number of free resources in a first window of available transmission resources usable for transmission by the UE; means for identifying a second number of free resources in at least one second window comprising at least a portion of the available transmission resources; and means for increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window.

Aspect 30: The UE of aspect 29, wherein the means for increasing the resource exclusion RSRP threshold further comprises means for increasing the resource exclusion RSRP threshold based only on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m.

Aspect 31: A non-transitory computer-readable medium storing computer-executable code, comprising code for causing an apparatus to perform a method of any one of aspects 1 through 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and/or 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of sidelink wireless communication for a user equipment (UE), the method comprising:
identifying a first number of free resources in a first window of available transmission resources usable for transmission by the UE;
identifying a second number of free resources in at least one second window comprising at least a portion of the available transmission resources;
increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window, wherein the first window comprises a first predetermined number of slots and the second window comprises a second predetermined number of slots; and
wherein the increasing the resource exclusion RSRP threshold further comprises increasing the resource exclusion RSRP threshold based on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m, wherein m and Y comprise positive integer numbers.

2. The method of claim 1, wherein the first percentage and the second percentage are equal.

3. The method of claim 1, wherein the increasing the resource exclusion RSRP threshold further comprises increasing the resource exclusion RSRP threshold by a predetermined step size.

4. The method of claim 1, further comprising:
further increasing the resource exclusion RSRP threshold in the UE in response to at least one of the first number of free resources or the second number of free resources remaining less than the respective first percentage or second percentage after increasing the resource exclusion RSRP threshold.

5. The method of claim 1, further comprising:
the at least one second window comprising a plurality of second windows within the first window of available transmission resources, wherein the plurality of second windows are non-overlapping in time;
identifying a third number of free resources in a second window of the plurality of second windows; and
increasing the resource exclusion RSRP threshold in the UE in response to least one of the first number of free resources, the second number of free resources, or the third number of free resources is less than the respective first percentage, second percentage, or third percentage.

6. The method of claim 1, wherein a size of the first and second windows is predetermined.

7. The method of claim 1, wherein the first and second percentages are predetermined.

8. The method of claim 1, wherein a size of the at least one second window is configured based on at least one radio resource control (RRC) message received from one of a base station over a downlink channel, another UE in communication with the UE via a sidelink.

9. The method of claim 1, wherein the first and second percentages are predetermined based on at least one radio resource control (RRC) message received from one of a base station over a downlink channel, another UE in communication with the UE via a sidelink, or preconfigured in the UE.

10. The method of claim 1, wherein a size of the first window is a function of a type of traffic being transmitted by one of the UE or another UE in communication with the UE.

11. The method of claim 1, further comprising:
configuring a plurality of sizes for the at least one second window, wherein each of the plurality of sizes is based on a respective traffic class or packet delay budget.

12. A user equipment (UE) configured for sidelink wireless communication, comprising:
a processor;
a wireless transceiver communicatively coupled to the processor; and
a memory communicatively coupled to the processor, wherein the processor and the memory are configured to:
identify a first number of free resources in a first window of available transmission resources usable for transmission by the UE;
identify a second number of free resources in at least one second window comprising at least a portion of the available transmission resources;
increase a resource exclusion reference signal receive power (RSRP) threshold in the UE in response to at least one of the first number of free resources being less than a first percentage of the available transmission resources within the first window or the second number of free resources being less than a second percentage of the available transmission resources within the second window, wherein the first window comprises a first predetermined number of slots and the second window comprises a second predetermined number of slots; and
wherein the processor and memory are further configured to increase the resource exclusion RSRP threshold based on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m, wherein m and Y comprise positive integer numbers.

13. The UE of claim 12, wherein the first percentage and the second percentage are equal.

14. The UE of claim 12, wherein the processor and the memory are further configured to increase the resource exclusion RSRP threshold by a predetermined step size.

15. A user equipment (UE) configured for sidelink wireless communication, comprising:
a processor;
a wireless transceiver communicatively coupled to the processor; and
a memory communicatively coupled to the processor, wherein the processor and the memory are configured to:
identify a first number of free resources in a first window of available transmission resources usable for transmission by the UE;
identify a second number of free resources in at least one second window comprising at least a portion of the available transmission resources;
increase a resource exclusion reference signal receive power (RSRP) threshold in the UE in response to at least one of the first number of free resources being less than a first percentage of the available transmission resources within the first window or the second number of free resources being less than a second percentage of the available transmission resources within the second window, and
wherein the processor and the memory are further configured to increase the resource exclusion RSRP threshold based on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m, wherein m and Y comprise positive integer numbers.

16. The UE of claim 12, further comprising the at least one second window comprising a plurality of second windows within the first window of available transmission resources, wherein the plurality of second windows is non-overlapping in time, and the processor and the memory further configured to:
identify a third number of free resources in a second window of the plurality of second windows; and
increase the resource exclusion RSRP threshold in the UE in response to least one of the first number of free resources, the second number of free resources, or the third number of free resources is less than the respective first percentage, second percentage, or third percentage.

17. The UE of claim 12, wherein a size of the first and second windows is predetermined.

18. The UE of claim 12, wherein the first and second percentages are predetermined.

19. The UE of claim 12, wherein a size of the at least one second window is configured based on radio resource control (RRC) messages received from one of a base station over a downlink channel, another UE in communication with the UE via a sidelink, or a vehicle roadside unit (RSU).

20. The UE of claim 12, wherein the first and second percentages are predetermined based on radio resource control (RRC) messages received from one of a base station over a downlink channel, another UE in communication with the UE via a sidelink, a vehicle roadside unit (RSU), or preconfigured in the UE.

21. The UE of claim 12, wherein a size of the first window is a function of a type of traffic being transmitted by one of the UE or another UE in communication with the UE.

22. The UE of claim 12, wherein the processor and the memory are further configured to configure a plurality of sizes for the at least one second window, wherein each of the plurality of sizes is based on a respective traffic class or a respective packet delay budget.

23. A user equipment (UE) for sidelink wireless communication in a wireless communication network, comprising:
    means for identifying a first number of free resources in a first window of available transmission resources usable for transmission by the UE;
    means for identifying a second number of free resources in at least one second window comprising at least a portion of the available transmission resources;
    means for increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window; and
    wherein the means for increasing the resource exclusion RSRP threshold further comprises means for increasing the resource exclusion RSRP threshold based only on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m, wherein m and Y comprise positive integer numbers.

24. A method of sidelink wireless communication for a user equipment (UE), the method comprising:

identifying a first number of free resources in a first window of available transmission resources usable for transmission by the UE;
identifying a second number of free resources in at least one second window comprising at least a portion of the available transmission resources;
increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window, wherein the first window comprises a first predetermined number of slots and the second window comprises a second predetermined number of slots, and
wherein the increasing the resource exclusion RSRP threshold is based on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m, wherein m and Y comprise positive integer numbers.

25. A user equipment (UE) for sidelink wireless communication in a wireless communication network, comprising:
    means for identifying a first number of free resources in a first window of available transmission resources usable for transmission by the UE;
    means for identifying a second number of free resources in at least one second window comprising at least a portion of the available transmission resources;
    means for increasing a resource exclusion reference signal receive power (RSRP) threshold in the UE in response to at least one of the first number of free resources being less than a first percentage of the available transmission resources within the first window or the second number of free resources being less than a second percentage of the available transmission resources within the second window, wherein the first window comprises a first predetermined number of slots and the second window comprises a second predetermined number of slots, and
wherein the means for increasing the resource exclusion RSRP threshold comprises means for increasing the resource exclusion RSRP threshold based on the identification of the first number of free resources in the first window being less than the first percentage of the available transmission resources within the first window in response to the first predetermined number of slots being from a slot 0 to a slot m and the second predetermined number of slots being from the slot 0 to a predetermined Y number of slots where Y is greater than m, wherein m and Y comprise positive integer numbers.

* * * * *